United States Patent
Wesner (10) Patent No.: US 11,293,675 B2
(45) Date of Patent: Apr. 5, 2022

(54) HEAT EXCHANGER AND METHOD FOR CONTROLLING OR REGULATING THE HEAT EXCHANGER

(71) Applicant: Mahle International GmbH, Stuttgart (DE)

(72) Inventor: Markus Wesner, Stuttgart (DE)

(73) Assignee: Mahle International GmbH, Stuttgart (DE)

(*) Notice: Subject to any disclaimer, the term of this patent is extended or adjusted under 35 U.S.C. 154(b) by 0 days.

(21) Appl. No.: 16/942,369

(22) Filed: Jul. 29, 2020

(65) Prior Publication Data
US 2021/0033320 A1 Feb. 4, 2021

(30) Foreign Application Priority Data
Jul. 29, 2019 (DE) ...................... 10 2019 211 229.3

(51) Int. Cl.
*F25B 41/31* (2021.01)
*F25B 39/00* (2006.01)
(Continued)

(52) U.S. Cl.
CPC .............. *F25B 41/31* (2021.01); *F25B 39/00* (2013.01); *F25B 49/02* (2013.01); *F25B 39/02* (2013.01);
(Continued)

(58) Field of Classification Search
CPC .... G05D 23/24; G05D 23/20; G05D 23/2236; F25B 2700/21174; F25B 2700/2117;
(Continued)

(56) References Cited

U.S. PATENT DOCUMENTS

| | | |
|---|---|---|
| 7,711,451 B2 | 5/2010 | Aue et al. |
| 8,827,546 B2 | 9/2014 | Vonsild et al. |
| 9,121,643 B2 | 9/2015 | Schaefer et al. |

(Continued)

FOREIGN PATENT DOCUMENTS

| | | |
|---|---|---|
| CN | 102144136 A | 8/2011 |
| CN | 203231672 U | 10/2013 |

(Continued)

OTHER PUBLICATIONS

Chinese Search Report dated Aug. 30, 2021 of Chinese counterpart application No. 202010736460.6 and English language translation thereof.

(Continued)

*Primary Examiner* — Schyler S Sanks
(74) *Attorney, Agent, or Firm* — Falk Ewers; Ewers IP Law PLLC (57) ABSTRACT

A heat exchanger, in particular a chiller, includes a heat exchanger block with a first fluid duct for a refrigerant and a second fluid duct for a coolant, an inlet and an outlet for the refrigerant, which are formed at a connecting flange and which are fluidically connected to the first fluid duct, a sensor for detecting a measured variable of the refrigerant, and an electronic expansion valve arranged in the inlet including an integrated regulating unit, wherein the expansion valve regulates a flow rate of the refrigerant in the inlet as a function of the detected measured variable. The sensor and the regulating unit are connected via a cable to transfer data. A port is formed at the expansion valve. The cable is further secured releasably or non-releasably in the respective port at the expansion valve. In addition, a method for controlling or regulating the heat exchanger is provided.

11 Claims, 4 Drawing Sheets

(51) Int. Cl.
*F25B 49/02* (2006.01)
*F25B 39/02* (2006.01)

(52) U.S. Cl.
CPC ............. *F25B 2600/2513* (2013.01); *F25B 2700/197* (2013.01); *F25B 2700/2117* (2013.01); *F25B 2700/21175* (2013.01)

(58) Field of Classification Search
CPC ...... F25B 2700/21175; F25B 2700/197; F25B 2600/2513; F25B 39/02; F25B 49/02; F25B 39/00; F25B 41/31
See application file for complete search history.

(56) References Cited

U.S. PATENT DOCUMENTS

| | | | |
|---|---|---|---|
| 9,874,385 B2 | 1/2018 | Izadi-Zamanabadi et al. | |
| 10,048,107 B2 | 8/2018 | Reuter | |
| 2003/0055603 A1* | 3/2003 | Rossi | F25B 49/02 702/185 |
| 2010/0031681 A1* | 2/2010 | Dolin | F25B 41/31 62/225 |
| 2011/0222576 A1* | 9/2011 | Vonsild | F25B 41/31 374/1 |
| 2013/0061630 A1* | 3/2013 | Schaefer | F25B 39/022 62/502 |
| 2015/0323234 A1* | 11/2015 | Izadi-Zamanabadi | F25B 49/02 62/225 |
| 2016/0279662 A1* | 9/2016 | Reuter | G01F 15/005 |
| 2018/0172328 A1 | 6/2018 | Feldkeller et al. | |

FOREIGN PATENT DOCUMENTS

| | | |
|---|---|---|
| CN | 104736953 A | 6/2015 |
| CN | 106017537 A | 10/2016 |
| CN | 106322867 A | 1/2017 |
| DE | 102004024663 A1 | 12/2005 |
| DE | 102010055613 A1 | 6/2012 |
| DE | 102011081886 A1 | 2/2013 |
| DE | 102015205933 A1 | 10/2016 |

OTHER PUBLICATIONS

Office Action dated Sep. 3, 2021 issued in Chinese counterpart application No. 202010736460.6 and English language Office Action Summary thereof.

* cited by examiner

HEAT EXCHANGER AND METHOD FOR CONTROLLING OR REGULATING THE HEAT EXCHANGER

CROSS REFERENCE TO RELATED APPLICATIONS

This application claims priority to German patent application DE 10 2019 211 229.3, filed Jul. 29, 2019, the entire content of which is incorporated herein by reference.

TECHNICAL FIELD

The disclosure relates to a heat exchanger and to a method for controlling or regulating a heat exchanger.

BACKGROUND

Heat exchangers are already known from the related art. For instance, a so-called chiller can be used in an electrically operated vehicle as heat exchanger to cool a traction battery. Waste heat, which is transferred into the coolant circuit of the vehicle via cooling plates, through which the coolant can flow, is created in battery cells of the traction battery in charging or discharging processes. The waste heat can then be transferred from the coolant circuit into the refrigerant circuit via the chiller. To regulate a flow rate of the refrigerant through the chiller and thus the refrigerant circuit, an electronic expansion valve can be inserted in the chiller. Said electronic expansion valve can be controlled or regulated with a control system—for example an air conditioning control system of the vehicle. Currently present state variables of the refrigerant—such as, for example, temperature or pressure—are determined for this purpose and are processed by the control system. The expansion valve is then controlled or regulated as a function of this in that the opening of the expansion valve or the speed of the compressor in the refrigerant circuit are adapted.

The currently present state variables of the refrigerant are thereby detected via sensors. The sensor can thus be arranged outside of the chiller at a refrigerant line and can indirectly detect temperature of the refrigerant. In the alternative, the sensor can detect pressure and temperature of the refrigerant at the output of the chiller. In both cases, the selection of the expansion valve is independent of the selection of the sensor. Disadvantageously, however, an additional separate data cable is required between the sensor and the control system as well as an additional connection for the data cable at the control system. A further option is to combine the sensor and the expansion valve in an assembly. The sensor can thus be connected to the control system via the data cable of the expansion valve, so that no additional connection has to be provided at the control system. Disadvantageously, however, an assembly of this type has a large weight and a large installation space requirement. In addition, the sensor cannot be selected independently of the expansion valve.

SUMMARY

It is thus an object of the disclosure to provide an improved or at least alternative embodiment for a heat exchanger, in particular a chiller, of the generic type, in the case of which the described disadvantages are overcome. An improved or at least alternative method for controlling or regulating the heat exchanger, in particular the chiller, is to further be provided.

These objects are achieved by a heat exchanger, in particular a chiller, and a method for controlling or regulating a heat exchanger as described herein.

A generic heat exchanger, in particular a chiller, has a heat exchanger block, which includes a first fluid duct for a refrigerant and a second fluid duct for a coolant. The heat exchanger further has an inlet and an outlet for the refrigerant, which are formed at a connecting flange of the heat exchanger and which are fluidically connected to the first fluid duct. The refrigerant can flow into the first fluid duct and thus into the heat exchanger block via the inlet and can flow out of the first fluid duct and thus out of the heat exchanger block via the outlet. In addition, the heat exchanger has at least one sensor for detecting at least one measured variable of the refrigerant. The heat exchanger further has an electronic expansion valve arranged in the inlet including an integrated regulating unit, wherein the expansion valve regulates a flow rate of the refrigerant in the inlet as a function of the at least one detected measured variable. According to an aspect of the disclosure, the at least one sensor and the regulating unit of the expansion valve are connected via a cable so as to transfer data, wherein at least one port is formed at the expansion valve, and wherein the cable is secured releasably or non-releasably in the respective port of the expansion valve.

The heat exchanger can be a stacked-plate heat exchanger. The heat exchanger block of the heat exchanger then includes several stacked plates, between which first hollow spaces for the refrigerant and second hollow spaces for the coolant are formed. The respective hollow spaces are then arranged alternately one on top of the other, so that the refrigerant and the coolant can exchange heat via the stacked disks. The first fluid duct is then formed with the first hollow spaces, and the second fluid duct is then formed with the second hollow spaces. The heat exchanger can alternatively be a flat-tube heat exchanger. The heat exchanger block of the heat exchanger then includes several flat tubes, with which the first fluid duct for the refrigerant is formed. The second fluid duct for the coolant is then formed around the flat tubes. In both exemplary embodiments, an input and an output for the coolant can be formed at the heat exchanger, which are then fluidically connected to the second fluid duct.

The regulating unit is integrated into the expansion valve and cannot be separated therefrom. In other words, the regulating unit is a part of the expansion valve. The expansion valve can comprise a housing, which surrounds the regulating unit. The respective port at the housing can advantageously be formed to be accessible from the outside, so that the cable can be secured in the respective port from the outside or can be released therefrom. The at least one sensor can then accordingly be interconnected with the regulating unit from the outside or can be separated therefrom. In addition, the expansion valve can have a regulating mechanism, which then regulates the flow rate of the refrigerant. The regulating mechanism can be appropriately arranged in the housing. In addition, a Local Interconnect Network (LIN) connection for a LIN cable or a corresponding plug can be formed at the housing. The regulating unit of the expansion valve and an external control system can then be connected via the LIN cable so as to transfer data. The regulating unit can include a cabling of the at least one sensor with the LIN connection and/or a control unit or an integrated control circuit, respectively. The cabling of the at least one sensor with the regulating unit of the expansion valve can take place via LIN or via an analog signal.

In the heat exchanger according to an aspect of the disclosure, output signals of the at least one sensor are used as input signals of the regulating unit and thus of the expansion valve and can be transferred to an external control system with the regulating unit. The at least one sensor is thereby not directly connected to the external control system, and an additional data cable as well as an additional connection to the external control system are dispensed with. The number of the data cables and of the connections and thus the integration effort for the customer can be reduced with the solution according to the disclosure. The sensor can further be selected independently of the expansion valve and can be positioned at or in the heat exchanger independently of the installation position of the expansion valve. Independently of the installation position of the sensor, the heat exchanger according to an aspect of the disclosure additionally has a low overall weight and a small installation space requirement. As a whole, a universal and cost-efficient solution is provided with the heat exchanger according to an aspect of the disclosure.

It can advantageously be provided that two sensors are provided in the heat exchanger. The one sensor is thereby arranged at the inlet and the other sensor at the outlet of the heat exchanger. The respective sensor is thereby a temperature sensor and the measured variable detected by said sensor is temperature of the refrigerant. The two sensors can be connected to the regulating unit of the expansion valve via the common cable via the respective port so as to transfer data. The controlling or regulating of the expansion valve can then take place as a function of the detected temperatures.

In the alternative, the sole sensor, which is arranged at the outlet of the heat exchanger, can be provided in the heat exchanger. The sensor is then a combined pressure-temperature sensor and detects two measured variables, wherein the one detected measured variable is temperature of the refrigerant, and the other detected measured variable is pressure in the refrigerant. The controlling or regulating of the expansion valve can then take place independently of the detected temperature and the detected pressure.

In the alternative, it can be provided that the sole sensor is provided in the heat exchanger and is arranged at the outlet of the heat exchanger. The sensor is then a temperature sensor and the detected measured variable is temperature of the refrigerant. In addition, an external sensor can be provided and can be arranged on the suction side in a refrigerant circuit, which includes the heat exchanger. The external sensor is then a pressure sensor and the detected measured variable is then pressure in the refrigerant. The controlling or regulating of the expansion valve can then take place independently of the detected temperature and the detected pressure.

The disclosure also relates to a method for controlling or regulating the above-described heat exchanger, in particular a chiller. The heat exchanger thereby has a heat exchanger block, which has a first fluid duct for a refrigerant and a second fluid duct for a coolant. In addition, the heat exchanger has an inlet and an outlet for the refrigerant, which are formed at a connecting flange of the heat exchanger and which are fluidically connected to the first fluid duct. The heat exchanger has at least one sensor for detecting at least one measured variable of the refrigerant. The heat exchanger further has an electronic expansion valve arranged in the inlet including an integrated regulating unit, which is connected to an external control system so as to transfer data.

The method thereby includes detecting of at least one measured variable of the refrigerant with the at least one sensor and a transmitting of the detected measured variable via a cable to the regulating unit of the expansion valve. The method further includes controlling or regulating the expansion valve with the regulating unit or with the external control system, which takes place as a function of the received measured variable of the sensor. The expansion valve thereby regulates a flow rate of the refrigerant in the inlet of the heat exchanger. The detected measured variable is thereby advantageously transmitted to the regulating unit of the expansion valve, so that the sensor is only connected to the regulating unit of the expansion valve so as to transfer data. The detected measured variable is thus transmitted only to the regulating unit and can be transferred to the control system only with the regulating unit. For this purpose, the external control system is connected to the regulating unit of the expansion valve, for example via a LIN system, so as to transfer data. For this purpose, a LIN connection can be provided at the expansion valve.

It can advantageously be provided that the heat exchanger is controlled or regulated in a first mode in the method. In the first mode, the regulating unit transfers the detected measured variable, after the latter has been received, to the external control system without being processed. After the unprocessed measured variable has been received, the latter is processed with the control system, and the expansion valve is controlled or regulated as a function thereof with the control system. In response to the processing, the received measured variable can be compared or computed, for example with variables stored in characteristic fields or with other received measured variables and/or can be changed with algorithms and/or can be stored in a memory.

In the alternative, it can be provided that the heat exchanger is controlled or regulated in a second mode in the method. In the second mode, the regulating unit processes the detected measured variable, after the latter has been received, and the regulating unit transfers the processed measured variable to the external control system. After the processed measured variable has been received, the latter is further processed with the control system, and the expansion valve is controlled or regulated as a function thereof with the control system. In response to the processing, the received measured variable can be compared or computed, for example with variables stored in characteristic fields or with other received measured variables and/or can be changed with algorithms and/or can be stored in a memory.

In the alternative, it can be provided that the heat exchanger is controlled or regulated in a third mode in the method. In the third mode, the regulating unit processes the detected measured variable, after the latter has been received, and the expansion valve is controlled or regulated as a function thereof with the control system. In the third mode, the heat exchanger is controlled or regulated solely with the regulating unit without including the external control system. The electronic expansion valve is not controlled or regulated by the external control system in the third mode, so that the electronic expansion valve can be compared to a thermostatic expansion valve in this mode. This mode can be used, in particular, if no controlling or regulating with the external control system is desired or possible. The third mode can thereby be permanently turned on or can be temporarily turned on by the external control system, depending on the current operating situation. The third mode has the advantage that the expansion valve does not need to be permanently controlled or regulated by the external control system.

In the third mode, the heat exchanger can advantageously be controlled or regulated in a high-load sub mode or in an average-load sub mode or in a weak-load sub mode. The high-load sub mode corresponding to a high performance of the heat exchanger, which corresponds to a small overheating of typically approximately 0-3 K and the so-called "wet setting". The average-load sub mode corresponds to an average performance, which corresponds to an average overheating of typically approximately 4-7 K and the so-called "average setting". The average load sub mode corresponds to a standard operation of the heat exchanger. The weak-load sub mode corresponds to a low performance, which corresponds to a high overheating of typically approximately 8-12 K and the so-called "dry setting". The weak-load sub mode corresponds to a turn-on mode. A switchover can advantageously be made between the sub modes, depending on the operating situation.

It can advantageously be provided that two measured variables of the refrigerant are detected with two sensors of the heat exchanger in the method. The one sensor then detects temperature of the refrigerant at the inlet as measured variable, and the other sensor detects temperature of the refrigerant at the outlet of the heat exchanger as measured variable. The respectively detected measured variable is then transmitted to the regulating unit with the respective sensor. After the detected variables have been received in the regulating unit, they are then further processed as a function of the selected mode of the method. In the alternative, it can be provided that two measured variables of the refrigerant are detected with the sole sensor of the heat exchanger in the method. The sensor is arranged at the outlet of the heat exchanger and detects temperature of the refrigerant and pressure in the refrigerant as measured variables. The sensor then transmits the detected variables to the regulating unit. After the receipt of the detected variables in the regulating unit, they are then further processed as a function of the selected mode of the method.

In the alternative, it can be provided that two measured variables of the refrigerant are detected with the sole sensor of the heat exchanger and with an external sensor. The one measured variable is thereby detected with the sole sensor of the heat exchanger and the other measured variable with the external sensor. The sole sensor is arranged at the outlet of the heat exchanger and thereby detects temperature of the refrigerant as measured variable. The sensor transmits this measured variable to the regulating unit. On the suction side, the external sensor detects pressure as measured variable in a refrigerant circuit including the heat exchanger and transmits the detected measured variable directly to the external control system for further processing. This alternative can thereby only be used in the case of the first mode or in the case of the second mode of the method. The detected measured variable of the sole sensor is thus further processed after the receipt in the regulating unit or is transmitted to the external control unit without being processed.

Further important features and advantages of the disclosure follow from the drawings, and from the corresponding figure description on the basis of the drawings.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure are illustrated in the drawings and will be described in more detail in the following description, whereby identical reference numerals refer to identical or similar or functionally identical components.

Figure 1:
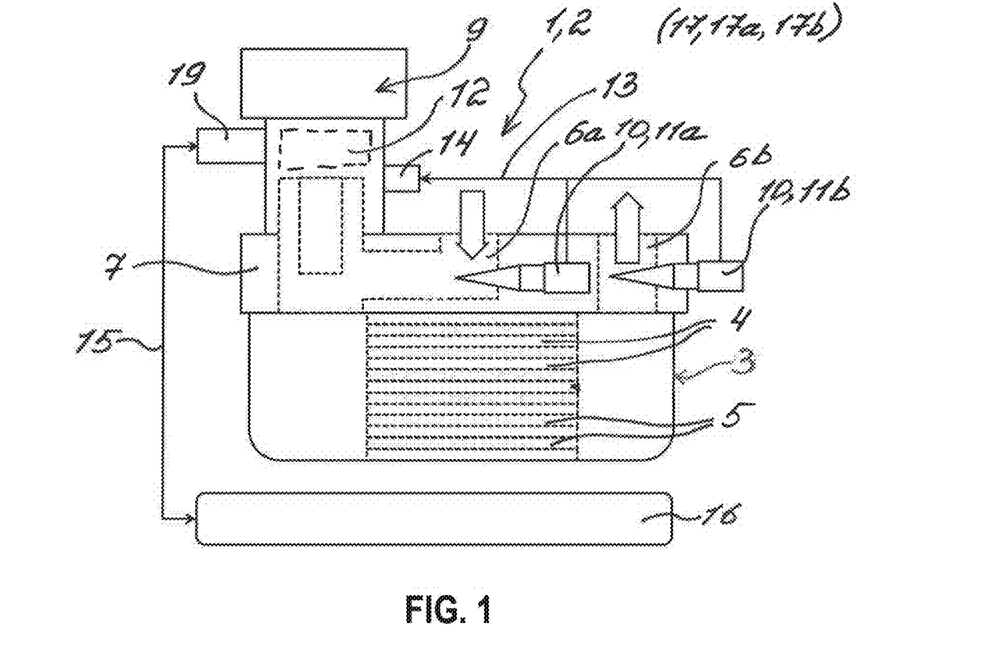
FIG. 1 shows a view of a heat exchanger which is controlled or regulated in a first or in a second mode of a method according to a first exemplary embodiment of the disclosure.
Figure 2:
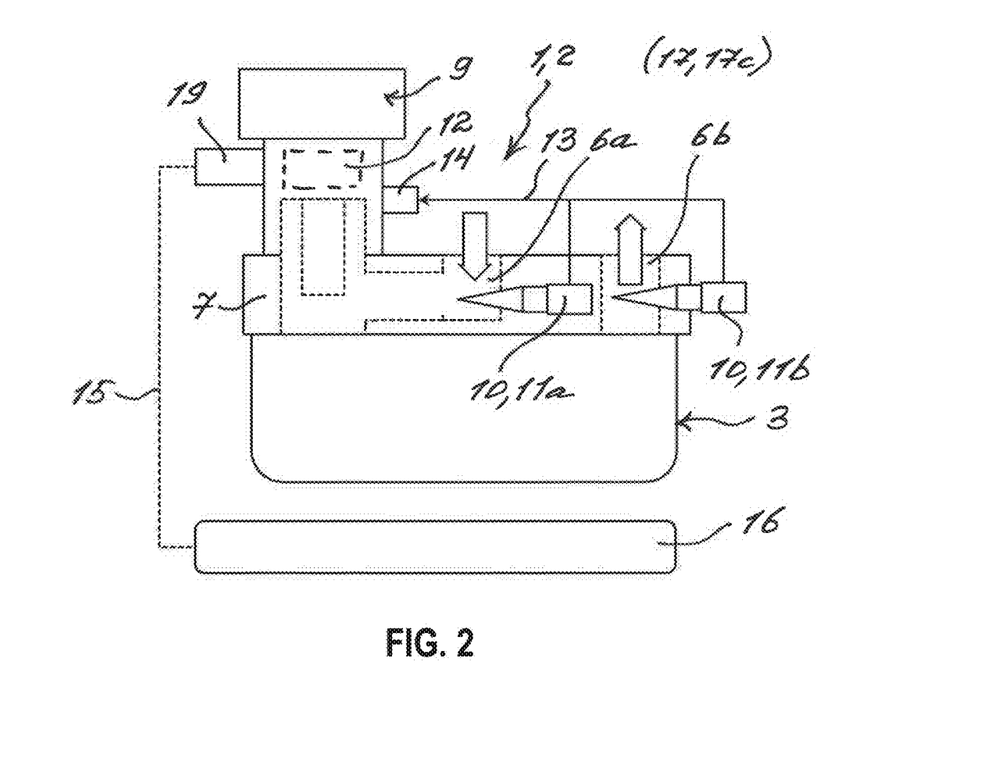
FIG. 2 shows a view of the heat exchanger which is controlled or regulated in a third mode of the method according to the first exemplary embodiment of the disclosure.

FIG. 1 and FIG. 2 show a view of a heat exchanger 1—here a chiller 2—according to a first embodiment of the disclosure. The heat exchanger 1 has a heat exchanger block 3, which includes a first fluid duct 4 for a refrigerant and a second fluid duct 5 for a coolant. The heat exchanger 1 further has an inlet 6a and an outlet 6b for the refrigerant, which are formed at a connecting flange 7 of the heat exchanger 1 and are fluidically connected to the first fluid duct 4. The refrigerant can flow into the first fluid duct 4 and thus into the heat exchanger block 3 via the inlet 6a, and can flow out of the first fluid duct 4 and thus out of the heat exchanger block 3 via the outlet 6b, as suggested with arrows. In addition, the heat exchanger 1 has an input 8a and an output 8b for the coolant—show in FIG. 6—which are fluidically connected to the second fluid duct 5. The coolant can then flow back into the second fluid duct 5 and thus into the heat exchanger block 3 via the input 8a, and can flow out of the second fluid duct 5 and thus out of the heat exchanger block 3 via the output 8b. The refrigerant and the coolant can exchange heat in the heat exchanger block 3 of the heat exchanger 1. The heat exchanger 1 has an electronic expansion valve 9 including an integrated regulating unit 12, which is arranged in the inlet 6a.

In the first exemplary embodiment, the heat exchanger 1 has two sensors 10 for detecting two measured variables. The sensors 10 are temperature sensors 11a and 11b, which are each arranged in the inlet 6a and in the outlet 6b and which detect temperature of the refrigerant as measured variable. The expansion valve 9 then regulates a flow rate of the refrigerant in the inlet 6a as a function of the detected temperatures at the inlet 6a and at the outlet 6b. The two sensors 10 are connected to the regulating unit 12 via a cable 13 so as to transfer data and in a releasable manner, for the purpose of which a port 14 for the cable 13 is provided at the expansion valve 9. In this exemplary embodiment, only one port 14 is provided for the cable 13, which connects the two sensors 10 together with the regulating unit 12 so as to transfer data. However, one port 14 can in each case be provided for each of the sensors 10 at the expansion valve 9 and they can then be connected to the regulating unit 12 via separate cables so as to transfer data. Further ports can further also be provided at the expansion valve. The heat exchanger 1 in the first exemplary embodiment can be controlled or regulated in three modes with a method 17 according to an exemplary embodiment of the disclosure.

With reference to FIG. 1, a first mode 17a and a second mode 17b of the method 17 will be described in more detail below. The detected measured variables—here temperature of the refrigerant at the inlet 6a and at the outlet 6b—are first transmitted to the regulating unit 12 via the cable 13, as indicated with arrows. The control unit 12 or the expansion valve 9, respectively, is connected via a LIN system 15 with a corresponding LIN connection 19 to the expansion valve 9 with an external control system 16 so as to transfer data. If the heat exchanger 1 is operated in the first mode 17a, the detected measured variables are transferred via the LIN system 15 to the control system 16, after being received in the regulating unit 12, without being processed. If the heat exchanger 1 is operated in the second mode 17b, the detected measured variables are first processed after being received in the regulating unit 12 and are then transferred to the control system 16 via the LIN system 15. The control system 16 then processes the received measured variables in both modes 17a and 17b, and controls or regulates the expansion valve 9 as a function thereof. The controlling or regulating—or a transfer of control or regulating signals, respectively—then takes place via the LIN system 15. The communication between the external control system 16 and the expansion valve 9 via the LIN system 15 is indicated with arrows.

Figure 7:
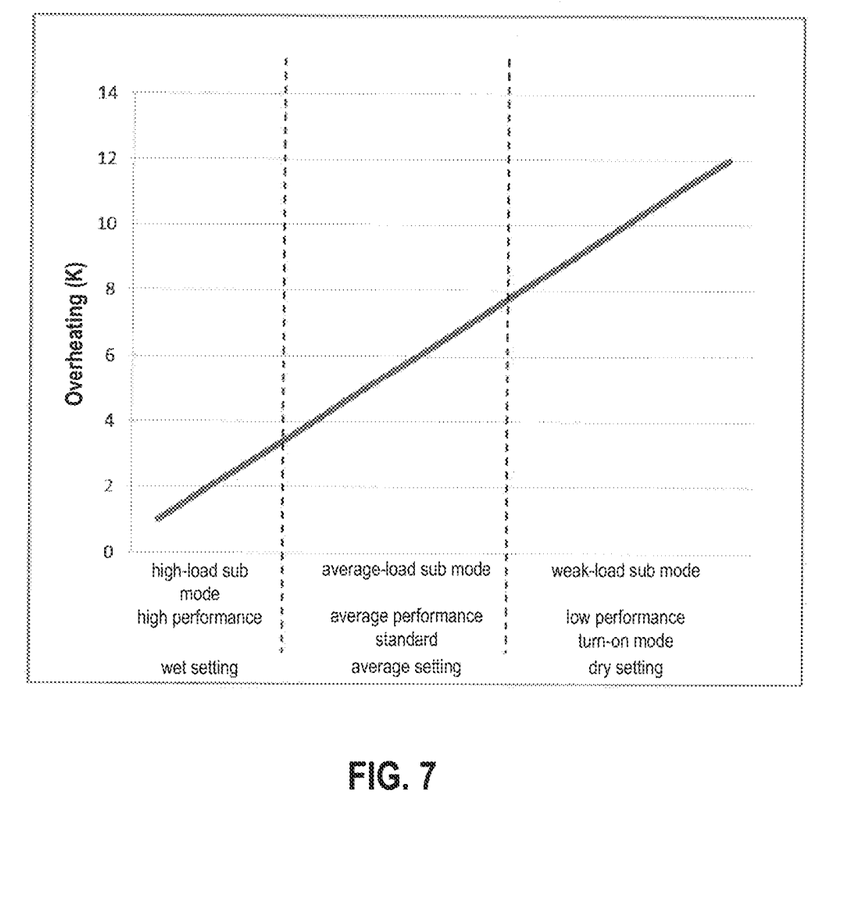
FIG. 7 shows a diagram for several sub modes within the third mode.

With reference to FIG. 2, a third mode 17c of the method 17 will be described in more detail below. The detected measured variables—here temperature of the refrigerant at the inlet 6a and at the outlet 6b—are transmitted to the regulating unit 12 via the cable 13, as suggested with arrows. The detected measured variables are processed in the regulating unit 12, and the expansion valve 9 is controlled or regulated by the regulating unit 12 as a function thereof. Even though the regulating unit 12 or the expansion valve 9, respectively, can be connected to the external control system 16 via a LIN system 15 so as to transfer data, a data transfer does not take place. This is indicated with a broken line. Within the third mode 17c, the heat exchanger 1 can be controlled or regulated in one of the three sub modes. The sub modes are shown in FIG. 7.

Figure 3:
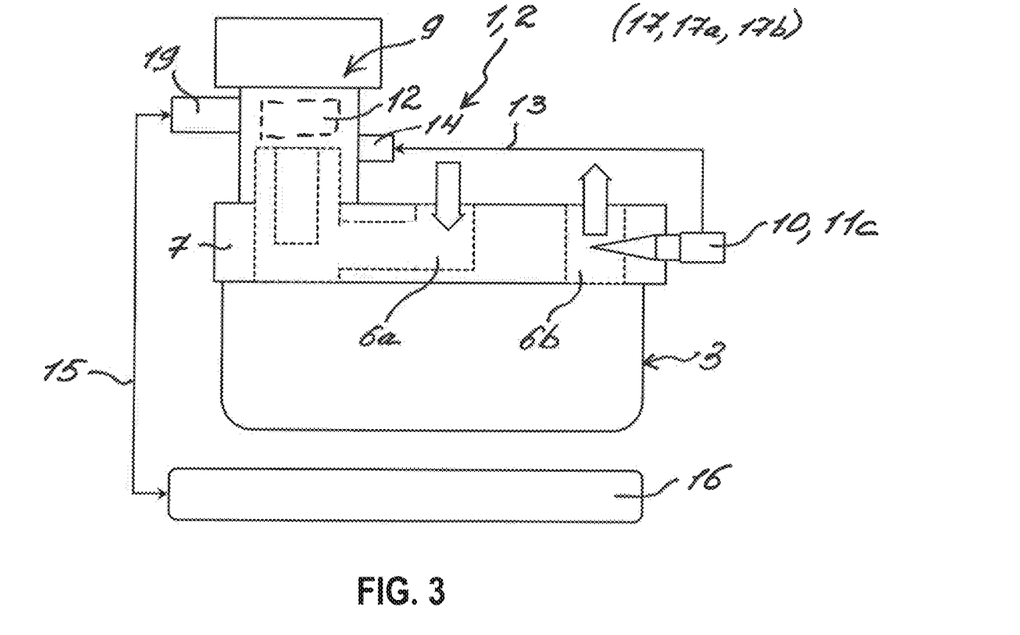
FIG. 3 shows a view of the heat exchanger which is controlled or regulated in the first or in the second mode of the method according to a second exemplary embodiment of the disclosure.
Figure 4:
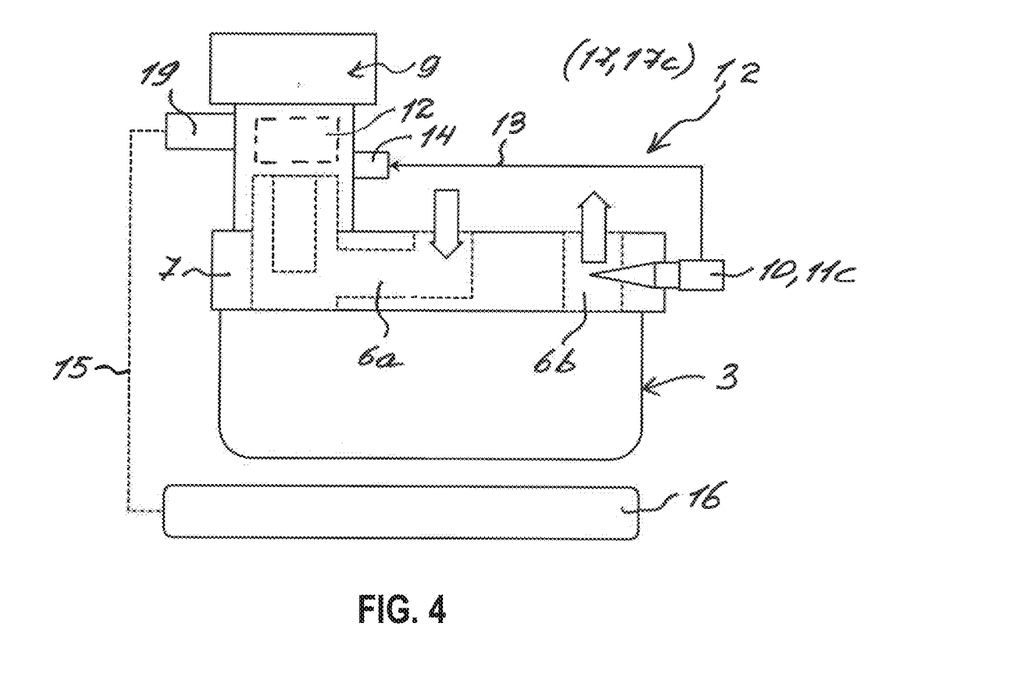
FIG. 4 shows a view of the heat exchanger which is controlled or regulated in a third mode of the method according to the second exemplary embodiment of the disclosure.

FIG. 3 and FIG. 4 show views of the heat exchanger 1 according to a second exemplary embodiment of the disclosure. The differences between the second exemplary embodiment and the first exemplary embodiment will be discussed separately below. Apart from that, the two exemplary embodiments are consistent. In deviation from the first exemplary embodiment, the heat exchanger 1 has the sole sensor 10 here, which is a combined pressure-temperature sensor 11c. The pressure-temperature sensor 11c is arranged at the outlet 6b of the heat exchanger 1 and detects two measured variables—temperature and pressure of the refrigerant. The sensor 10 then transmits the detected measured variables to the regulating unit 12 via the cable 13, as suggested with arrows.

With reference to FIG. 3, the heat exchanger 1 in the second exemplary embodiment can be controlled or regulated in the first mode 17a and in the second mode 17b of the method. This takes place analogously to the first exemplary embodiment of the heat exchanger 1, as described with reference to FIG. 1. In deviation, the temperature and the pressure are used as measured variables here to control or regulate the expansion valve 9. With reference to FIG. 4, the heat exchanger 1 in the second exemplary embodiment can also be controlled or regulated in the third mode 17c of the method 17. This takes place analogously to the first exemplary embodiment of the heat exchanger 1, as described with reference to FIG. 2. In deviation, the temperature and the pressure are used as measured variables here to control or regulate the expansion valve 9. The heat exchanger 1 can be controlled and regulated in one of the three sub modes within the third mode 17c. The sub modes are shown in FIG. 7.

Figure 5:
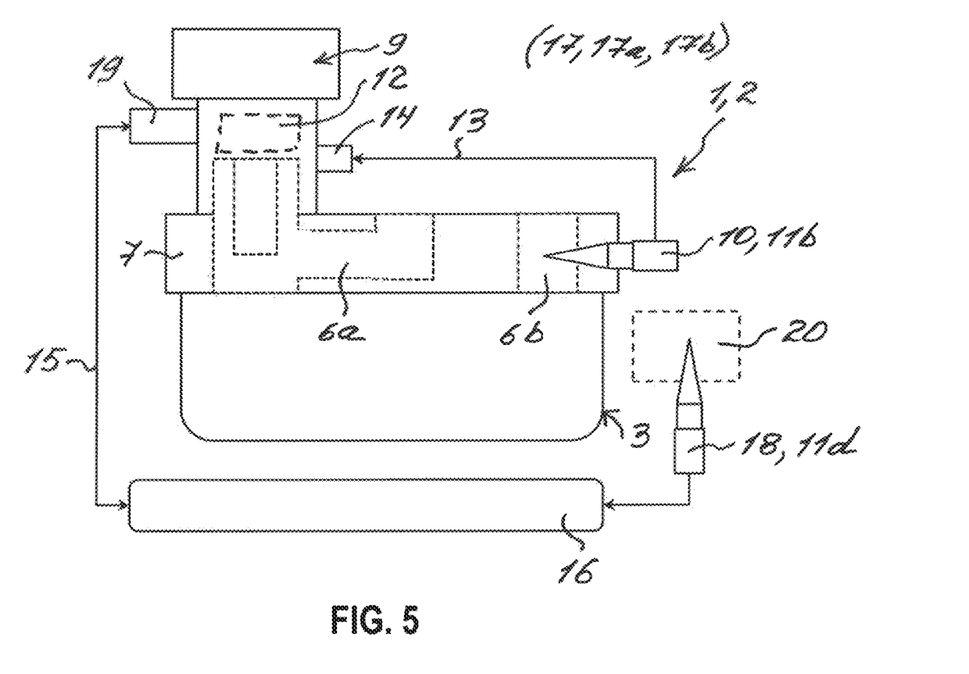
FIG. 5 shows a view of the heat exchanger which is controlled or regulated in the first or in the second mode of the method according a third exemplary embodiment of to the disclosure.

FIG. 5 shows a view of the heat exchanger 1 according to a third exemplary embodiment of the disclosure. The differences between the third exemplary embodiment and the first exemplary embodiment will be discussed separately below. Apart from that, the two exemplary embodiments are consistent. In deviation from the first exemplary embodiment, the heat exchanger 1 has the sole sensor 10 here, which is the temperature sensor 11b here. The temperature sensor 11b is arranged at the outlet 6b of the heat exchanger 1 and detects temperature of the refrigerant as measured variable. An external sensor 18 is further provided, which is a pressure sensor 11d. The external sensor 18 is thereby arranged on the suction side in a refrigerant circuit 20, which includes the heat exchanger, and detects pressure of the refrigerant as measured variable.

The heat exchanger 1 in the third exemplary embodiment can only be controlled or regulated in the first mode 17a or in the second mode 17b of the method 17. The sensor 10 thereby transmits the detected measured variable to the regulating unit 12 via the cable 13, as indicated with arrows. If the heat exchanger 1 is operated in the first mode 17a, the detected measured variable is transferred to the control system 16 via the LIN system 15 without being processed after being received in the regulating unit 12. If the heat exchanger 1 is operated in the second mode 17b, the detected measured variable is first processed after being received in the regulating unit 12 and is then transferred to the control system 16 via the LIN system 15. In both modes 17a and 17b, the external sensor 18 transmits the detected measured variable directly to the external control system 16, as indicated with the arrow. The control system 16 then processes the received measured variables in both modes 17a and 17b and controls or regulates the expansion valve 9 as a function thereof. The communication between the control system 16 and the regulating unit 12 takes place via the LIN system 15, as guested with arrows.

Figure 6:
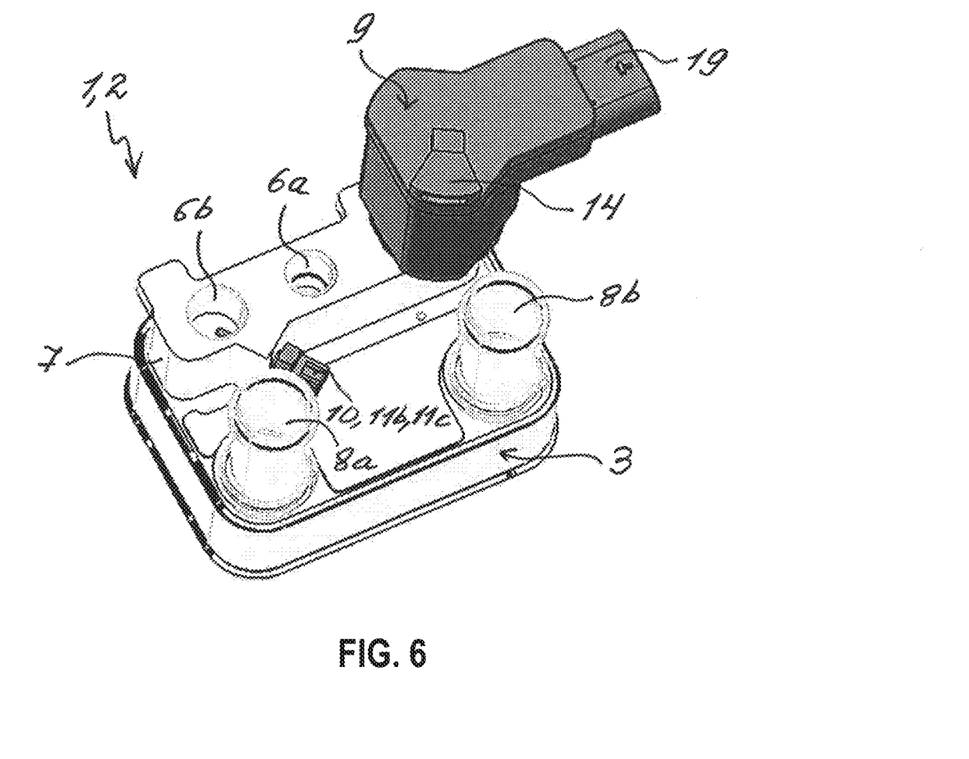
FIG. 6 shows a view of the heat exchanger according to the second or third exemplary embodiment of the disclosure.

FIG. 6 shows a view of the heat exchanger 1 according to an exemplary embodiment of the disclosure. If the sensor 10 at the outlet 6b is the pressure-temperature sensor 11c, the exemplary embodiment shown here corresponds to the heat exchanger 1 in the second exemplary embodiment. If the sensor 10 at the outlet 6b is the temperature sensor 11b, the exemplary embodiment shown here corresponds to the heat exchanger 1 in the third exemplary embodiment. As shown here, the heat exchanger 1 has the input 8a and the output 8b, which are fluidically connected to the second fluid duct 5.

The coolant flows into the second fluid duct 5 and thus into the heat exchanger block 3 via the input 8a, and the coolant flows out of the second fluid duct 5 and thus out of the heat exchanger block 3 via the output 8b. The LIN connection 19 and the port 14, which are formed at the expansion valve 9 or at a housing 20, respectively, of the expansion valve 9, are also shown here. The regulating unit 12 can be connected to the control system 16 via the LIN connection 19 of the expansion valve 9 and can be connected to the sensor 10 via the port 14 so as to transfer data. A cable 13 between the port 14 and the sensor 10 is not illustrated here for the sake of clarity.

A diagram is shown in FIG. 7, in which three possible sub modes within the third mode 17c are identified. In the third mode 17a, the heat exchanger 1 can be controlled or regulated in a high-load sub mode, in an average-load sub mode, or in a weak-load sub mode. The high-load sub mode corresponds to a high performance of the heat exchanger 1, which corresponds to a small overheating of typically approximately 0-3 K and the so-called "wet setting". The average-load sub mode corresponds to an average performance, which corresponds to an average overheating of typically approximately 4-7 K and the so-called "average setting". The average load sub mode corresponds to a standard operation of the heat exchanger 1. The weak-load sub mode corresponds to a low performance, which corresponds to a high overheating of approximately 8-12 K and the so-called "dry setting". The weak-load sub mode corresponds to a turn-on mode.

Here, the heat exchanger 1 is the chiller 2, which can be used, for example, to cool a traction battery in an electrically operated vehicle. The chiller 2 is then fluidically integrated into the refrigerant circuit of an air-conditioning system of the vehicle and into the coolant circuit of the vehicle. The control system 16 is then an air-conditioning control system, which controls or regulates the chiller 2 in the first mode 17a and in the second mode 17b of the method 17. The external sensor 18 or the pressure sensor 11d, respectively, can be a part of the air-conditioning system.

It is understood that the foregoing description is that of the exemplary embodiments of the disclosure and that various changes and modifications may be made thereto without departing from the spirit and scope of the disclosure as defined in the appended claims.

What is claimed is:

1. A heat exchanger comprising:
a heat exchanger block, which has a first fluid duct for a refrigerant and a second fluid duct for a coolant;
an inlet and an outlet for the refrigerant, which are formed at a connecting flange of the heat exchanger and which are fluidically connected to the first fluid duct;
at least one sensor for detecting at least one variable of the refrigerant;
an electronic expansion valve arranged in the inlet comprising an integrated control circuit, wherein the expansion valve regulates a flow rate of the refrigerant in the inlet as a function of the at least one detected variable,
wherein the at least one sensor and the integrated control circuit of the expansion valve are connected via a first cable to transfer data,
wherein at least one port is formed at the expansion valve, wherein the first cable is secured releasably or non-releasably in a respective port at the expansion valve,
wherein the integrated control circuit is further connected to an external control system via a second cable to transfer data, wherein the heat exchanger is configured to:
detect at least one variable of the refrigerant with the at least one sensor;
transmit the detected variable via the first cable to the integrated control circuit of the expansion valve; and
control or regulate the expansion valve with the integrated control circuit as a function of the received variable of the sensor, wherein the expansion valve regulates a flow rate of the refrigerant in the inlet, and
wherein the heat exchanger is controlled or regulated in first and second modes, and in the second mode, the integrated control circuit:
processes the detected variable;
transfers the processed variable to the external control system via the second cable; and
in the second mode, after the processed variable has been received, the external control system further processes the processed variable and controls or regulates the expansion valve as a function thereof.

2. The heat exchanger according to claim 1, wherein:
first and second sensors are provided in the heat exchanger,
the first sensor is arranged at the inlet of the heat exchanger and the second sensor is arranged at the outlet of the heat exchanger, and
the first and second sensors are temperature sensors and the variable detected by the first sensor is the temperature of the refrigerant at the inlet of the heat exchanger and the variable detected by the second sensor is the temperature of the refrigerant at the outlet of the heat exchanger.

3. The heat exchanger according to claim 1, wherein:
only one sensor, which is arranged at the outlet of the heat exchanger, is provided in the heat exchanger, and that the one sensor is a combined pressure-temperature sensor and detects two variables, and
one detected variable is a temperature of the refrigerant, and the other detected variable is a pressure of the refrigerant.

4. The heat exchanger according to claim 1, wherein:
a first-sensor is provided in the heat exchanger and is arranged at the outlet of the heat exchanger,
the first sensor is a temperature sensor and the detected variable is the temperature of the refrigerant,
in addition, an external sensor is provided and is arranged on a suction side in a refrigerant circuit, which comprises the heat exchanger, and
the external sensor is a pressure sensor and the detected variable is a pressure of the refrigerant.

5. The heat exchanger according to claim 1, wherein:
the heat exchanger is controlled or regulated in a first mode, and
in the first mode, the integrated control circuit transfers the detected variable, after the detected variable has been received, to the external control system without being processed, and
in the first mode, the external control system processes the unprocessed variable, after the detected variable has been received, and controls or regulates the expansion valve as a function thereof.

6. The heat exchanger according to claim 1, wherein:
the heat exchanger is controlled or regulated in the first and second modes and in a third mode,
in the third mode, the integrated control circuit processes the detected variable, after the detected variable has been received and controls or regulates the expansion valve as a function thereof, without including the external control system.

7. The heat exchanger according to claim 6, wherein:
in the third mode, the heat exchanger is controlled or regulated in a high-load sub mode or in an average-load sub mode or in a weak-load sub mode,
the high-load sub mode corresponds to a high performance of the heat exchanger,
the average-load sub mode corresponds to an average performance of the heat exchanger, and
the weak-load sub mode corresponds to a low performance of the heat exchanger.

8. The heat exchanger according to claim 1, wherein:
two variables of the refrigerant are detected with two sensors of the heat exchanger,
the one sensor detects a temperature of the refrigerant at the inlet, and
the other sensor detects the temperature of the refrigerant at the outlet of the heat exchanger and transmit them to the integrated control circuit.

9. The heat exchanger according to claim 1, wherein:
two variables of the refrigerant are detected with a sole sensor of the heat exchanger,
the sole sensor being arranged at the outlet of the heat exchanger detects a temperature of the refrigerant and a pressure of the refrigerant and transmits the temperature of the refrigerant and the pressure of the refrigerant to the integrated control circuit.

10. The heat exchanger according to claim 5, wherein:
first and second variables of the refrigerant are detected with a sole sensor of the heat exchanger and with an external sensor,
the first variable is detected with the sole sensor of the heat exchanger and the second variable is detected with the external sensor,
the sole sensor is arranged at the outlet of the heat exchanger detects a temperature and transmits the temperature to the integrated control circuit, and
on a suction side, the external sensor detects a pressure in a refrigerant circuit comprising the heat exchanger and transmits the detected variable directly to the external control system for further processing.

11. A heat exchanger as claimed in claim 1, wherein the heat exchanger is a chiller.

* * * * *